United States Patent
Kanehira et al.

(10) Patent No.: US 6,845,021 B2
(45) Date of Patent: Jan. 18, 2005

(54) MULTI-OUTPUT DC-DC CONVERTER

(75) Inventors: Hiroki Kanehira, Miyagi (JP); Hiroshi Akama, Miyagi (JP)

(73) Assignee: Sony Corporation (JP)

(*) Notice: Subject to any disclaimer, the term of this patent is extended or adjusted under 35 U.S.C. 154(b) by 102 days.

(21) Appl. No.: 10/220,019
(22) PCT Filed: Dec. 10, 2001
(86) PCT No.: PCT/JP01/10801

§ 371 (c)(1),
(2), (4) Date: Dec. 4, 2002

(87) PCT Pub. No.: WO02/052707

PCT Pub. Date: Jul. 4, 2002

(65) Prior Publication Data

US 2003/0141855 A1 Jul. 31, 2003

(30) Foreign Application Priority Data

Dec. 26, 2000 (JP) ........................... 2000-395857

(51) Int. Cl.$^7$ .............................................. H02M 5/42
(52) U.S. Cl. ............................. 363/91; 363/67; 323/267
(58) Field of Search ........................... 363/21.01, 21.07, 363/21.08, 21.16, 56.01, 67, 69, 90, 91, 93; 323/267, 205, 206

(56) References Cited

U.S. PATENT DOCUMENTS 4,642,743 A * 2/1987 Radcliffe ................. 363/21.07
6,157,554 A * 12/2000 Hamaoka et al. ............. 363/46

FOREIGN PATENT DOCUMENTS

| JP | 52-11116 | 1/1977 |
| JP | 62-147863 | 7/1987 |
| JP | 1-318552 | 12/1989 |
| JP | 11-18427 A | 1/1999 |

OTHER PUBLICATIONS

International Search Report.

* cited by examiner

Primary Examiner—Jessica Han
(74) Attorney, Agent, or Firm—Rader, Fishman & Grauer PLLC; Ronald P. Kananen

(57) ABSTRACT

The present invention provides a multi-output DC-DC converter which supplies an input direct voltage to a series circuit consisting of a primary winding (3a) of a transformer (3) and a switching circuit (2) to obtain first and second output direct voltages from a secondary winding (3b) of the transformer (3) via first and second rectifying circuits, wherein a switching signal of the switching circuit (2) is controlled corresponding to the first output direct voltage so that the first output direct voltage is caused to be constant, and a variable reactor (10) is inserted into the second rectifying circuit. Thus, loss of power can be reduced in a simplified configuration.

5 Claims, 9 Drawing Sheets

MULTI-OUTPUT DC-DC CONVERTER

TECHNICAL FIELD

The present invention relates to a multi-output DC-DC converter which is used as a power supply apparatus for various electronic apparatuses.

BACKGROUND ART

Generally, a DC-DC converter is used to obtain an output direct voltage which is dependent on the turn ratio of a transformer for performing voltage conversion, and an output direct voltage from a DC-DC converter is often not compatible with a direct voltage which is required to be supplied to an electronic circuit.

In case an output direct voltage from a DC-DC converter is not compatible with a direct voltage required by an electronic circuit, an output direct voltage from a DC-DC converter is supplied to a series regulator or a step-down chopper to be converted to a required direct voltage.

Such a series regulator is not expensive, however, if the difference between an output direct voltage from a DC-DC converter and a required direct voltage is large, there is raised a problem that loss of power is enlarged, which leads to low conversion efficiency. Consequently, a heat sink or a fan is required to be used so as to release radiated heat, which leads to difficulty in reducing a DC-DC converter in size.

On the other hand, a step-down converter may be used instead, in which loss of power is not large. However, since the number of oscillating switching units is increased, there is raised a problem that noise and interference (beat noise) with other outputs are undesirably induced. Furthermore, increase in the number of parts leads to a higher expense.

The applicant of the present invention suggests a DC-DC converter whose rectifying circuit has a reactor inserted therein as a DC-DC converter which can reduce loss of power in a comparatively simplified manner (Japanese Laying-Open Patent H11-18427).

On the other hand, in a conventional DC-DC converter, there is a problem that an output direct voltage cannot be set up freely by changing turn ratio of a transformer to be used.

In the case where a transformer 50 is used in a DC-DC converter, as shown in FIG. 1, a first output voltage V1 and a second output voltage V2 of the transformer 50 are proportional to a winding number, or a winding times, N1 at point "a" and a winding number N2 at point "b" of a secondary winding 50b of the transformer 50, respectively. That is, for example, if the first output voltage V1 is 12 V and the winding number N1 is 4, corresponding voltage for one winding is 3 V, thus the second output voltage V2 becomes (N2×3) V which is a multiple of 3 V. So, only an output direct voltage of multiple of 3 V can be obtained. So, in a conventional DC-DC converter, an output direct voltage of an arbitrary value cannot be obtained.

DISCLOSURE OF THE INVENTION

Accordingly, the present invention has an object to overcome the above-mentioned drawbacks of the prior art by providing a multi-output DC-DC converter which can reduce loss of power, and a multi-output DC-DC converter which can reduce loss of power, from which an output direct voltage of an arbitrary value cannot be obtained.

The above object can be attained by providing a multi-output DC-DC converter which supplies an input direct voltage to a series circuit consisting of a primary winding of a transformer and a switching circuit to obtain first and second output direct voltages from a secondary winding of the transformer via first and second rectifying circuits, wherein a switching signal of the switching circuit is controlled corresponding to the first output direct voltage so that the first output direct voltage is caused to be constant, and a variable reactor is inserted into the second rectifying circuit.

In the thus configured DC-DC converter, since a switching signal of the switching circuit is controlled corresponding to the first output direct voltage, the first output direct voltage of a constant value can be obtained. Also, since a variable reactor is inserted into the second rectifying circuit, a second output direct voltage, which is lowered without loss of power, can be obtained corresponding to the value of the variable reactor by average rectifying processing based on energy accumulation effect of the variable reactor.

BEST MODE FOR CARRYING OUT THE INVENTION

Figure 1:
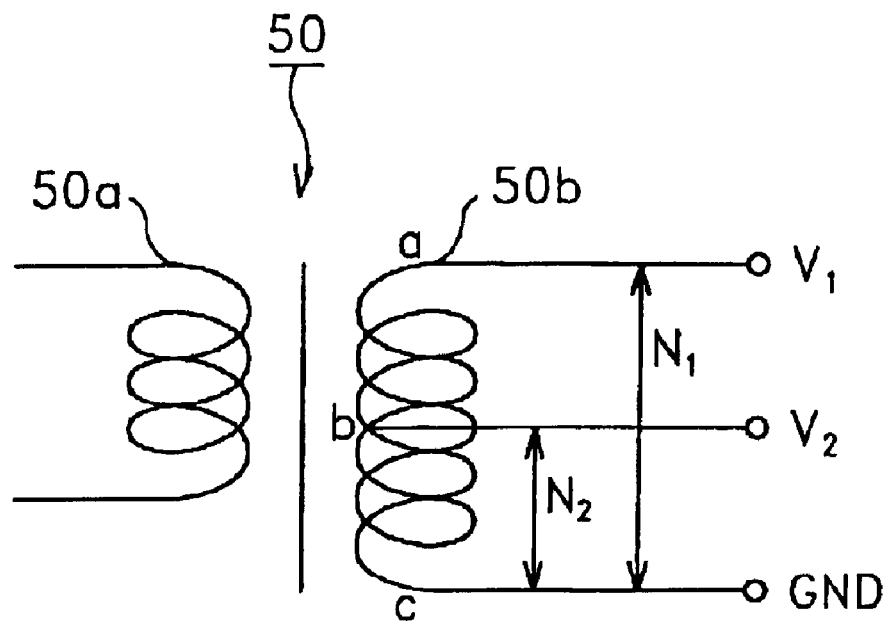
FIG. 1 shows a diagram for explaining an output voltage of a conventional DC-DC converter.

The present invention will further be described below concerning the best modes with reference to the accompanying drawings.

Firstly, a first embodiment of a DC-DC converter according to the present invention will be explained with reference to FIG. 2. A DC-DC converter shown in FIG. 2 includes a transformer 3 which has its primary winding 3a connected to a battery 1 of a predetermined direct voltage value via a switching circuit 2. The transformer 3 has a secondary winding 3b which has its one end connected to a ground terminal 4c and has its midpoint "a", at which a voltage of slightly larger than such as 5 V can be obtained, connected to the anode of a diode 5 which configures a rectifying circuit. The diode 5 has its cathode connected to the ground terminal 4c via a capacitor 6 for smoothing processing and to a first output terminal 4a at which a first output direct voltage of 5 V can be obtained.

The first output direct voltage obtained at the first output terminal 4a is supplied to a controlling circuit 7. Then, the controlling circuit 7 sends an output signal to control the switching circuit 2 so that the first output direct voltage obtained at the first output terminal 4a is caused to be of a constant value of such as 5 V.

The secondary winding 3b of the transformer 3 has its other end "b" connected to the anode of a diode 8 which also configures a rectifying circuit. It is assumed that a winding number at point "a" and a winding number at point "b" of the secondary winding 3b are N1 and N2, respectively, and that N1:N2=1:3. In this case, in case a voltage of slightly larger than 5 V is obtained at the "a" point, a voltage of slightly larger than 15 V can be obtained at the "b" point.

The diode 8 has its cathode connected to the ground terminal 4c via a series circuit consisting of a variable reactor 10 for voltage drop processing and a capacitor 11 for smoothing processing, and the connection point of the variable reactor 10 and the capacitor 11 is connected to a second output terminal 4b via a series regulator 12. At the second output terminal 4b, a second output direct voltage of such as 12 V, which is stabilized by the series regulator 12, can be obtained.

In thus configured DC-DC converter, the variable reactor 10 performs voltage drop processing so that a voltage to be supplied to the series regulator 12 becomes approximately 13 V. In this case, the variable reactor 10 can perform voltage drop processing corresponding to the value of the variable reactor 10 without loss of power by average rectifying processing based on energy accumulation effect. The value of the variable reactor 10 is controlled by an output signal from an error amplifier 13 which detects an input voltage of the series regulator 12.

Figure 3:
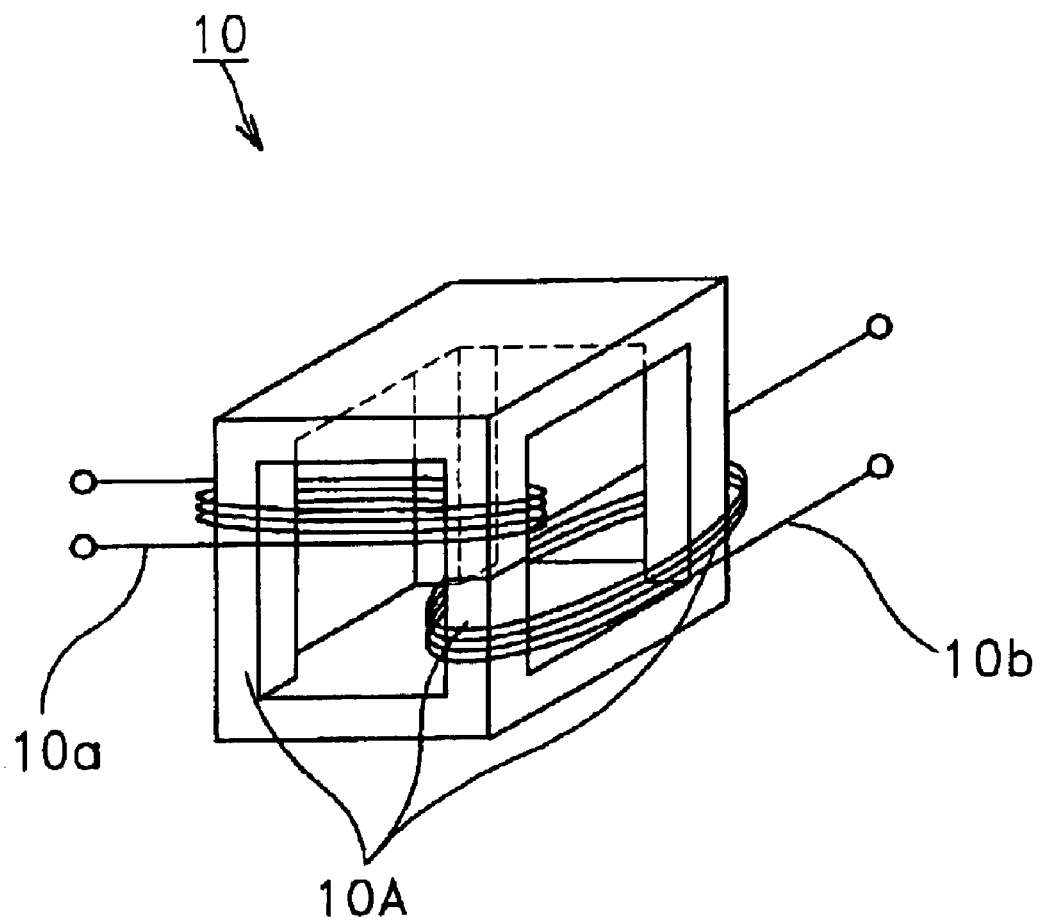
FIG. 3 shows a perspective view of an example of a variable reactor arranged in the DC-DC converter shown in FIG. 2.

As shown in FIG. 3, the variable reactor 10 has a main winding 10a and a controlling winding 10b which are wound around a four-magnetic-pole core 10A, and the value of the variable reactor 10 is caused to be changed in accordance with a current flowing through the controlling winding 10b.

Figure 4:
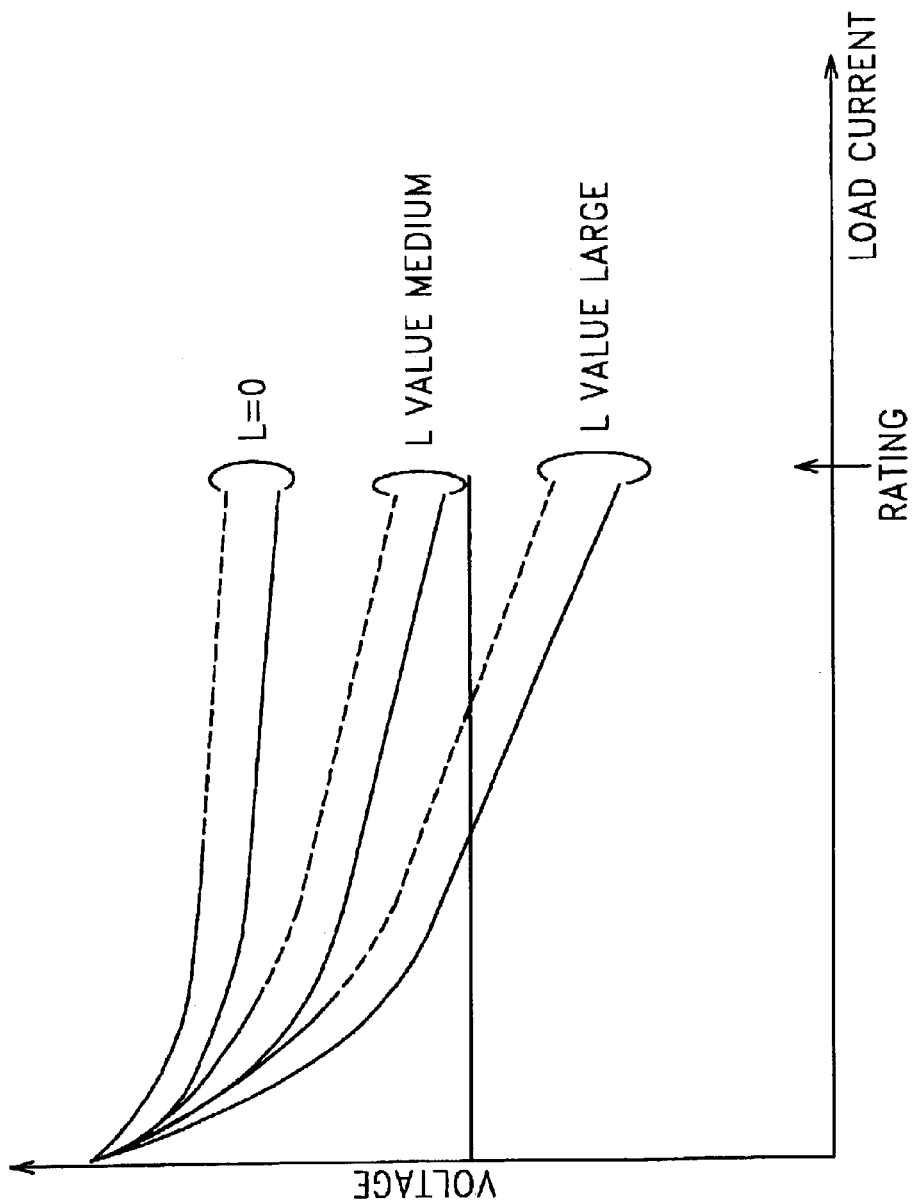
FIG. 4 shows the relationship between an input voltage and a load current of a series regulator arranged in the DC-DC converter shown in FIG. 2.

FIG. 4 shows how a voltage is dropped corresponding to the value of the variable reactor 10. In case the reactor is not variable, the reactor value is set to be a value by which a voltage of a predetermined value can be obtained at a rated load, for example, "L value medium" shown in FIG. 4.

In the DC-DC converter, an input voltage of the series regulator 12 increases in proportion to a load current from the first output terminal 4a, as shown by dotted lines in FIG. 4.

In the DC-DC converter shown as the first embodiment, as has been described above, by changing pulse width of an output signal from the controlling circuit 7 which controls the switching circuit 2 corresponding to the first output direct voltage of 5 V, the first output direct voltage of a constant value such as 5 V can be obtained at the first output terminal 4a. Also, the variable reactor 10 is arranged at the output side of the diode 8. Thus, a voltage of such as 13 V, which is lowered without loss of power, can be obtained at the input side of the series regulator 12 by average rectifying processing based on energy accumulation effect of the variable reactor 10. So, an output direct voltage of a constant value such as 12 V can be obtained at the output side of the series regulator 12 or at the second output terminal 4b.

In the DC-DC converter shown as the first embodiment, a voltage to be supplied to the input side of the series regulator 12 is lowered to be such as 13 V, so that the difference between a voltage at the input side and a voltage to be obtained at the output side of the series regulator 12 is lessened. So, loss of power raised by the series regulator 12 can advantageously be reduced, that is, conversion efficiency becomes advantageously high.

Furthermore, in the DC-DC converter shown as the first embodiment, even though the series regulator 12 is not required, an output direct voltage of a constant value can be obtained at the second output terminal 4b without loss of power.

Thus, in the DC-DC converter shown as the first embodiment, a plurality of stable output direct voltages can easily be obtained in a simplified configuration without loss of power. So, the DC-DC converter can advantageously be reduced in size, and can advantageously be of high credibility.

Figure 2:
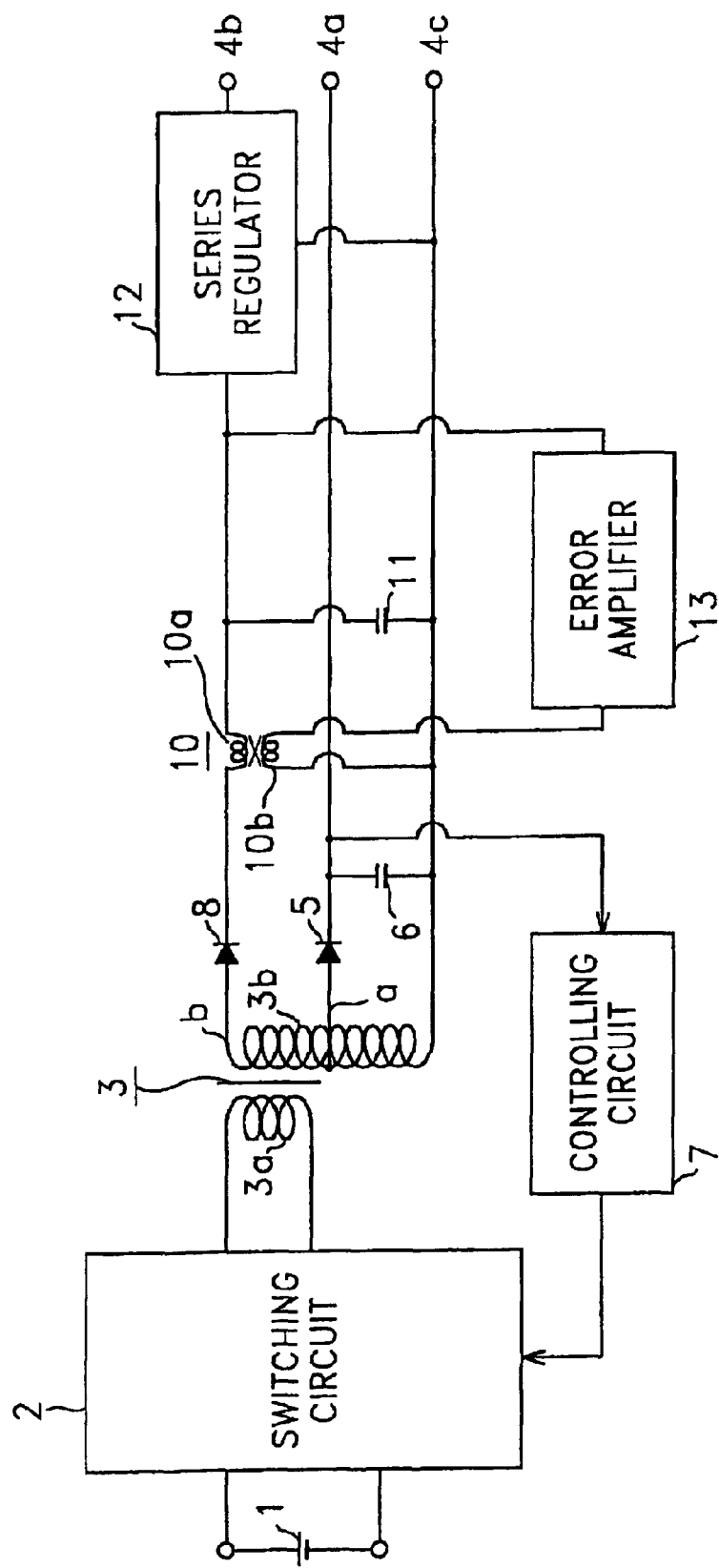
FIG. 2 shows the configuration of a first embodiment of a DC-DC converter according to the present invention.
Figure 5:
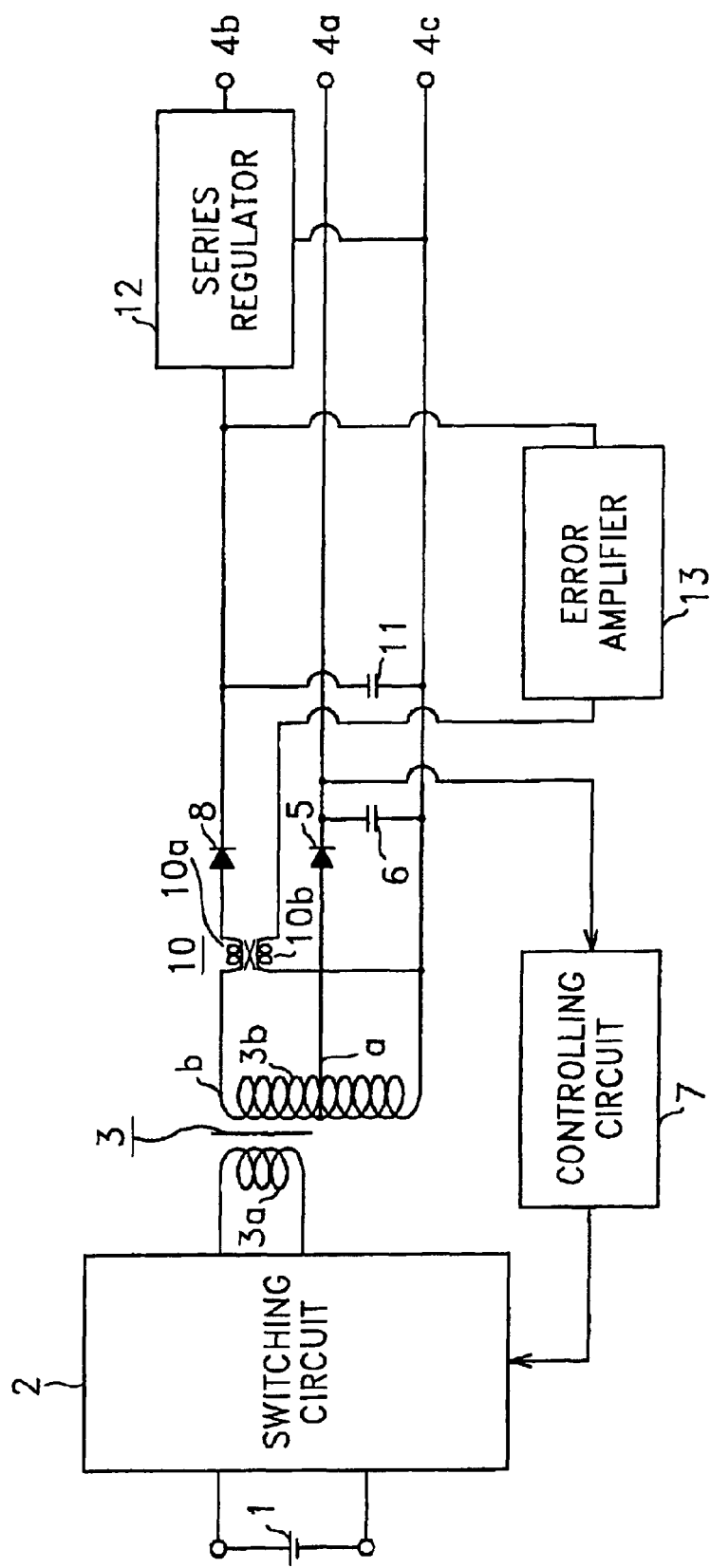
FIG. 5 shows the configuration of a second embodiment of a DC-DC converter according to the present invention.

In the DC-DC converter shown in FIG. 2, the variable reactor 10 is arranged at the cathode side of the diode 8 which configures a rectifying circuit, which is connected to the end "b" of the secondary winding 3b of the transformer 3. On the other hand, as shown in FIG. 5, the variable reactor 10 can be arranged at the anode side of the diode 8 as a second embodiment of a DC-DC converter, in which a similar operation can be performed. In the DC-DC converter shown in FIG. 5 as the second embodiment, parts or components similar to those of the DC-DC converter shown in FIG. 2 are indicated with the same reference numerals, and a detailed description thereof will be omitted.

Next, a third embodiment of a DC-DC converter according to the present invention will be explained with reference to FIG. 6.

Figure 6:
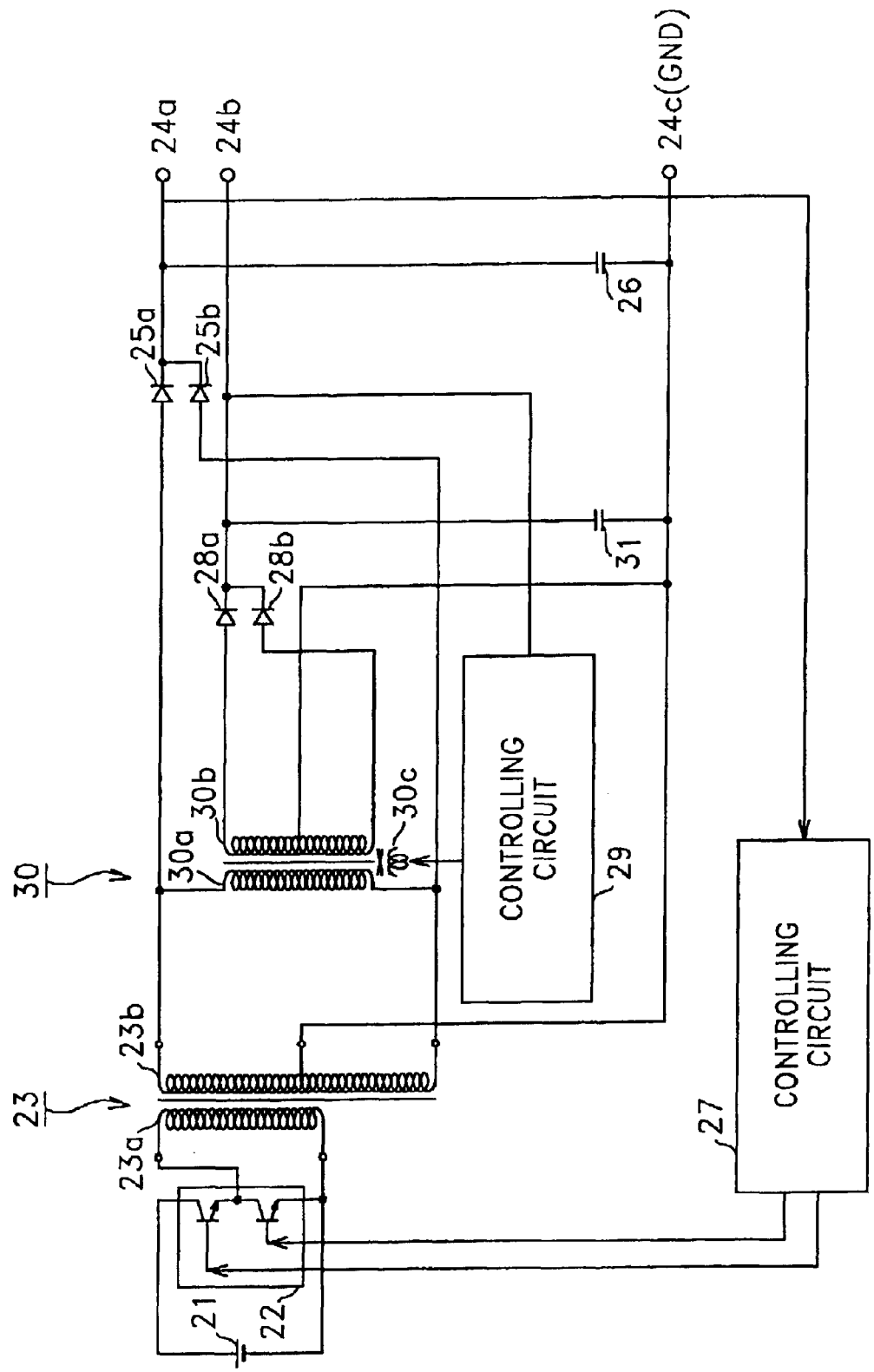
FIG. 6 shows the configuration of a third embodiment of a DC-DC converter according to the present invention.

A DC-DC converter shown in FIG. 6 includes a transformer 23 which has its primary winding 23a connected to a battery 21 of a predetermined direct voltage value via a switching circuit 22. The switching circuit 22 has two transistors, as shown in FIG. 6, and on/off operation is controlled by base currents flowing through the transistors. And, a power of the battery 21 is supplied to the primary winding 23a of the transformer 23.

The transformer 23 has a secondary winding 23b which has its midpoint connected to a ground terminal 24c and has both of its ends connected to anodes of a diode 25a and a diode 25b which configure rectify circuits, respectively. The diodes 25a and 25b have their cathodes connected to the ground terminal 24c via a capacitor 26 for smoothing processing as well as to a first output terminal 24a at which a first output direct voltage can be obtained.

The first output direct voltage obtained at the first output terminal 24a is supplied to a controlling circuit 27. Then, the controlling circuit 27 sends an output signal to control the switching circuit 22 so that the first output direct voltage obtained at the first output terminal 24a is caused to be of a constant value.

The secondary winding 23b of the transformer 23 has both of its ends connected to the ends of a primary winding 30a of a variable reactor 30, respectively.

The variable reactor 30 has a secondary winding 30b which has its midpoint connected to the ground terminal 24c and has both of its ends connected to anodes of a diode 28a and a diode 28b which configure rectifying circuits, respectively. The diodes 28a, 28b have their cathodes connected to the ground terminal 24c via a capacitor 31 for smoothing processing as well as to a second output terminal 24b at which a second output direct voltage can be obtained.

The second output direct voltage obtained at the second output terminal 24b is supplied to a controlling circuit 29. Then, the controlling circuit 29 sends an output signal to a third winding 30c being a controlling winding of the variable reactor 30 to control the variable reactor 30 so that the second output direct voltage obtained at the second output terminal 24b is caused to be of a constant value.

Figure 7:
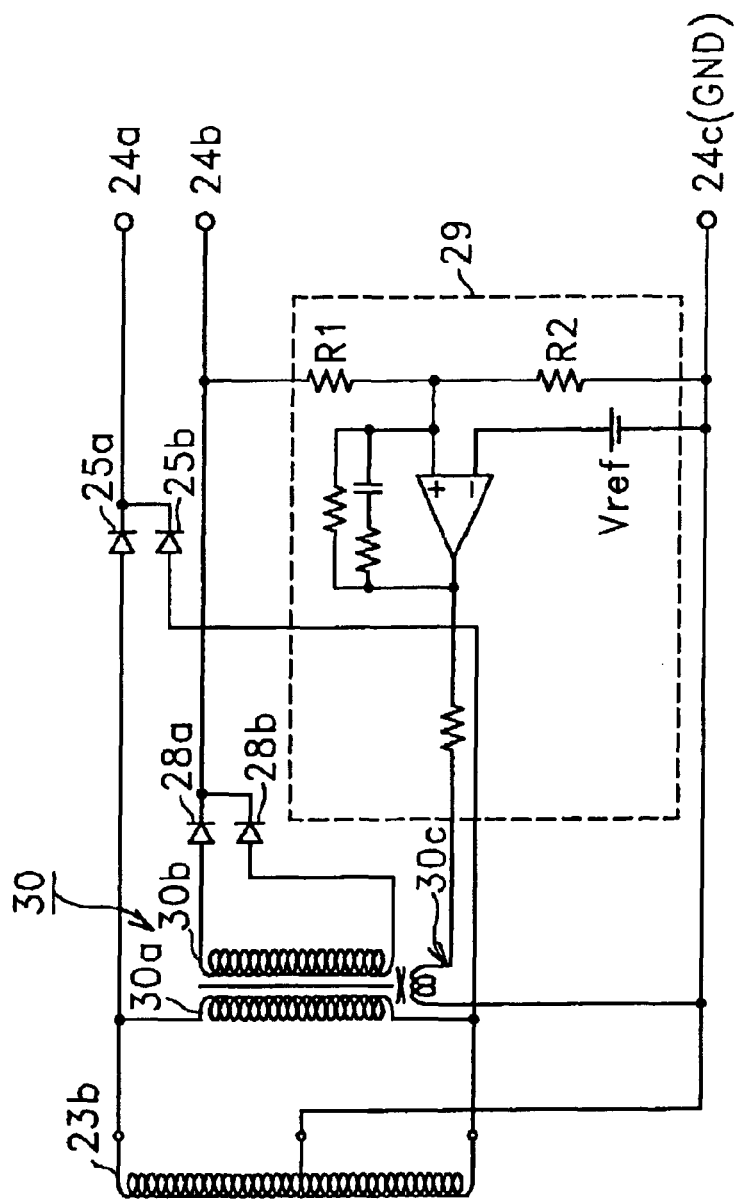
FIG. 7 shows the configuration of an example of a controlling circuit arranged in the DC-DC converter shown in FIG. 6.

The controlling circuit 29 can be configured by a circuit using an operational amplifier, as shown in FIG. 7.

In the variable reactor 30, if a winding number of the primary winding 30a and a winding number of the secondary winding 30b are N1 and N2, respectively, the ratio of the first output direct voltage obtained at the first output terminal 24a with respect to the second output direct voltage obtained at the second output terminal 24b is dependent on the ratio of N1:N2. Thus a voltage of a desired value can be obtained by adjusting the ratio of N1:N2.

For example, it is assumed that a voltage of 10 V is supplied to the primary winding 30a and the winding number N1 of the primary winding 30a is 10; if an output voltage of 5 V is required at the second output terminal 24b, it is necessary to set the winding number N2 of the secondary winding 30b to be 5.

Thus, when the value of a voltage supplied to the primary winding 30a and the winding number N1 of the primary winding 30a are determined, an output voltage of a desirable value can be obtained at the second output terminal 24b by appropriately selecting the winding number N2 of the secondary winding 30b.

Figure 8A:
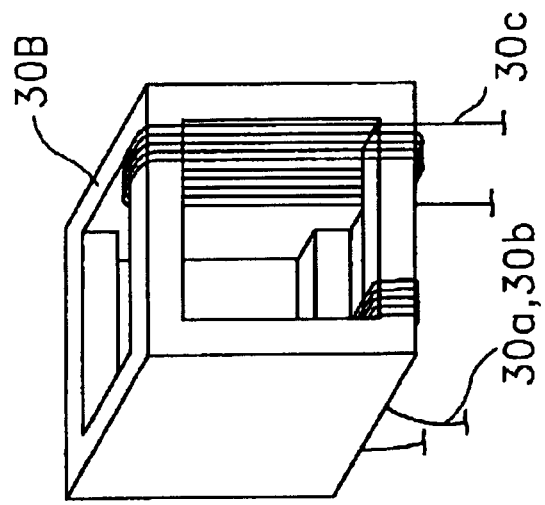
FIGS. 8A and 8B show perspective views of examples of variable reactors arranged in the DC-DC converter shown in FIG. 6.
Figure 8B:
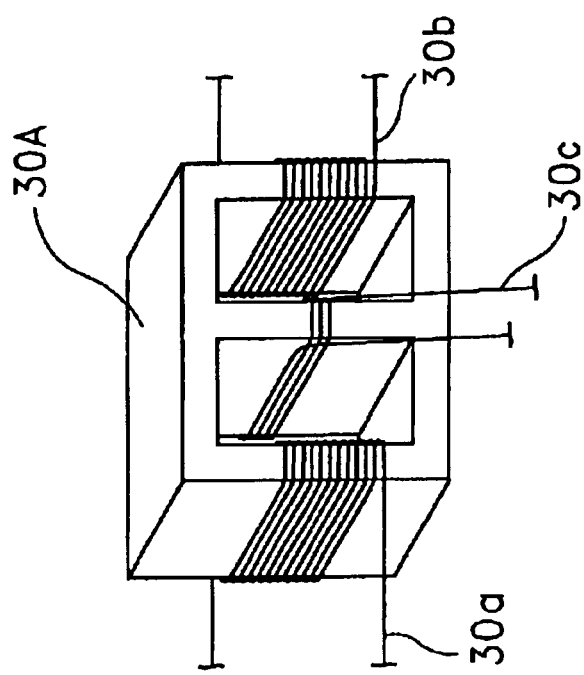

Next, examples of the configuration of the variable reactor 30 will be shown in FIG. 8A and FIG. 8B. The variable reactor 30 may be in the form of an E type core 30A shown in FIG. 8A, or a four-magnetic-pole core 30B shown in FIG. 8B. In any case, the inductance value of the variable reactor 30 can be changed by changing a current flowing through a third winding 30c being a controlling winding. That is, when a current of a predetermined value is caused to flow through the third winding 30c as a controlling winding, the magnetic flux density of cores used for the primary winding 30a and the secondary winding 30b are partially saturated, and thus the inductance value of the variable reactor 30 is caused to be changed. Thus, the value of the output direct voltage can be kept steady without being affected by a load of the output direct voltage.

Figure 9:
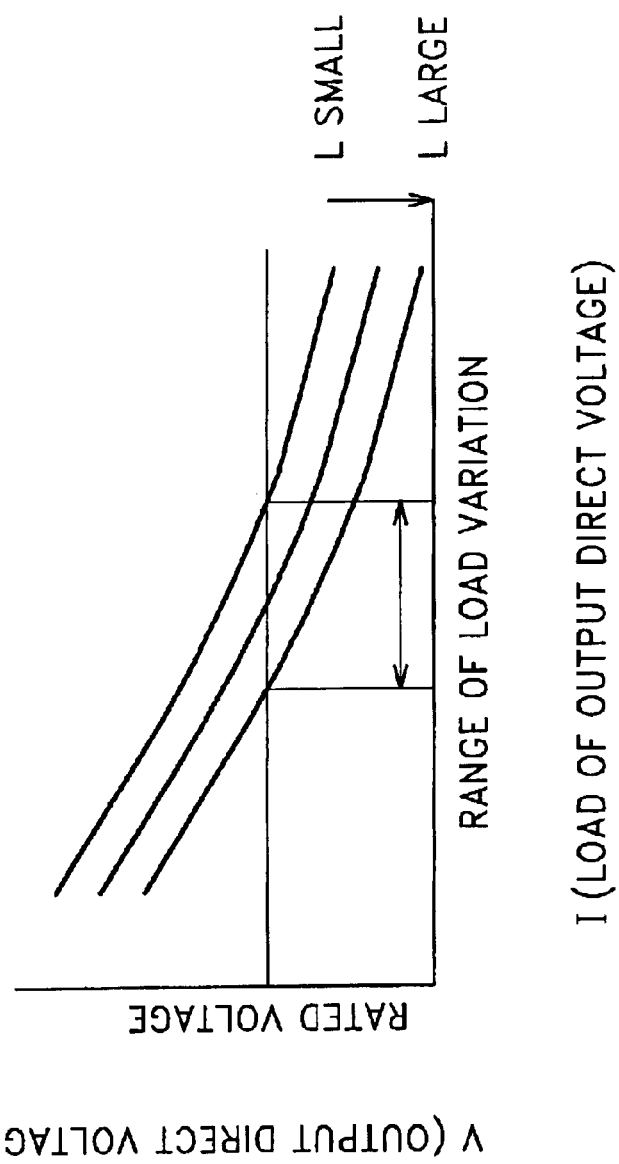
FIG. 9 shows the relationship between an output voltage and a load current of a variable reactor arranged in the DC-DC converter shown in FIG. 6.

FIG. 9 shows how a voltage is dropped corresponding to the value of the inductance of the variable reactor 30. In case the reactor is not variable, the inductance value is set to be a value by which a voltage of a predetermined value can be obtained at a rated load.

In the DC-DC converter shown as the third embodiment, by changing the pulse width of a switching signal to be sent to the switching circuit 22 corresponding to the first output direct voltage, the first output direct voltage of a constant value can be obtained at the first output terminal 24a. Also, the variable reactor 30 is arranged to be connected to both ends of the secondary winding 23b of the transformer 23. Thus, a voltage which is lowered without loss of power can be obtained by average rectifying processing based on the energy accumulation effect of the variable reactor 30. So, an output direct voltage of a constant value can be obtained at the second output terminal 24b.

Furthermore, in the DC-DC converter shown as the third embodiment, the second output direct voltage can be obtained at the second output terminal 24b without loss of power by controlling the inductance of the variable reactor 30.

Thus, a plurality of stable output direct voltages can easily be obtained in a simplified configuration without loss of power.

Furthermore, in the DC-DC converter shown as the third embodiment, a voltage of a desired value can be freely obtained by changing the ratio of the winding number N1 of the primary winding 30a and the winding number N2 of the secondary winding 30b of the variable reactor 30.

In the first embodiment and the third embodiment, the battery 1 and the battery 21 are used as a power of the DC-DC converter. On the other hand, instead of using the battery 1 and the battery 21, a direct voltage which can be obtained by rectifying an alternating current may be supplied to the switching circuit 2 and the switching circuit 22.

Furthermore, the present invention is not limited to the above-described embodiments, and various modifications can be possible without departing from the spirit and scope of the present invention.

INDUSTRIAL APPLICABILITY

As in the above, according to the multi-output DC-DC converter of the present invention, a plurality of stable output direct voltages can easily be obtained in a simplified configuration without loss of power. So, the multi-output DC-DC converter can advantageously be reduced in size, and can advantageously be of high credibility.

Furthermore, according to the multi-output DC-DC converter of the present invention, in case the variable reactor is inserted to the upstream of the second rectifying circuit and in parallel to the transformer, a voltage of a desired value can be obtained by adjusting the winding numbers of the primary winding and the secondary winding.

What is claimed is:

1. A multi-output DC-DC converter which supplies an input direct voltage to a series circuit consisting of a primary winding of a transformer and a switching circuit to obtain first and second output direct voltages from a secondary winding of the transformer via first and second rectifying circuits, wherein a switching signal of the switching circuit is controlled corresponding to the first output direct voltage so that the first output direct voltage is caused to be constant, and a variable reactor is inserted into the second rectifying circuit, and wherein the variable reactor is inserted to the upstream of the second rectifying circuit and in parallel to the transformer.

2. The multi-output DC-DC converter as set forth in claim 1, wherein said variable reactor includes a primary winding in parallel with the secondary winding of the transformer, and a secondary winding in circuit with third and fourth rectifying circuits to provide said second output voltage.

3. The multi-output DC-DC converter as set forth in claim 2, wherein said switching signal of said switching circuit is controlled by a first controlling circuit having said first output voltage as an input, and a second controlling circuit having said second output voltage as an input for providing an output to said variable reactor so that said second output direct voltage is of a constant value.

4. The multi-output DC-DC converter as set forth in claim 3, wherein said variable reactor includes a controlling winding in circuit with said second controlling circuit.

5. The multi-output DC-DC converter as set forth in claim 4, wherein said second controlling circuit is configured by a circuit using an operational amplifier.

* * * * *